(12) United States Patent
Martin et al.

(10) Patent No.: US 6,470,155 B1
(45) Date of Patent: Oct. 22, 2002

(54) MULTI-MARKET OPTIMIZED USER INTERFACE ASSEMBLY AND A REPROGRAPHIC MACHINE HAVING SAME

(75) Inventors: Andrew T. Martin, Webster, NY (US); Kimberly D. Elyjiw, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/836,597

(22) Filed: Apr. 18, 2001

(51) Int. Cl.$^7$ .............................................. G03G 15/00
(52) U.S. Cl. ............................. 399/81; 345/700; 700/83
(58) Field of Search .............................. 399/81; 700/17, 700/83; 345/700, 733, 744, 745, 747, 750, 860

(56) References Cited

U.S. PATENT DOCUMENTS 5,604,860 A * 2/1997 McLaughlin et al. ....... 345/810
5,832,339 A * 11/1998 Inui et al. ..................... 399/83
6,026,258 A * 2/2000 Fresk et al. ................... 399/87

* cited by examiner

*Primary Examiner*—Joan Pendegrass
(74) *Attorney, Agent, or Firm*—Tallam I. Nguti

(57) ABSTRACT

A plural-mode, multi-market user interface (UI) assembly is provided for increasing user satisfaction and productivity on units of the same model of a machine in a plurality of different user markets. The UI assembly includes a display screen for displaying user dialog information, a series of machine process control and user interactive functional features for operator access to control operation of the machine, a plurality of different market optimized user dialog information display modes that are connected to the series of machine process control and user interactive functional features, for displaying on the display screen, an associated controller, and a means or device for selectively switching from one to another of the plurality of different market optimized user dialog information display modes, thereby enabling increased user satisfaction and user productivity on the same model of a machine in a plurality of different user markets.

16 Claims, 4 Drawing Sheets

MULTI-MARKET OPTIMIZED USER INTERFACE ASSEMBLY AND A REPROGRAPHIC MACHINE HAVING SAME

BACKGROUND OF THE PRESENT INVENTION

The present invention is directed to user interfaces (UI's), and more specifically, to a plural-mode, multi-market optimized UI assembly and a reprographic machine having same, for increasing user satisfaction and productivity on the same reprographic machine in a plurality of different user markets.

A conventional reprographic machine is the office copier. Traditionally, the copier, in the office equipment context, refers to a light lens xerographic copier in which paper originals are in fact photographed. The images are focused on an area of a photoreceptor, which is subsequently developed with toner. The developed image on the photoreceptor is then transferred to a copy sheet which in turn is used to create a permanent copy of the original.

In recent years, however, there has been made available what is known as digital copiers or printing machines. In the most basic functions, a digital copier or printing machine performs the same functions as a light lens copier, except that includes a programmable controller for controlling its functions, and the original image to be copied is not directly focused on a photoreceptor. Instead, with a digital copier or printer, the original image is received, for example, from a personal computer (PC) work station, or storage media, or is scanned by a device generally known as a raster input scanner (RIS) which is typically in the form of a linear array of small photosensors. The controller further enables a wide range of image manipulation and processing capabilities.

The original image received as such is focused on the photosensors in the RIS. The photosensors convert the various light and dark areas of the original image to a set of digital signals. These digital signals are temporarily retained in a memory and then eventually are further processed, and manipulated/and or used as is with the aid of a user interface (UI) assembly, to operate the digital printing machine or copier when it is desired to print copies of the original. The digital signals may also be sent directly to the digital printing machine or copier without being stored in a memory. Typically, each such digital printing machine or copier.

Digital printing machines or copiers as such are currently being used in the market place of the general office environment. Usually such machines are used in this environment on a non-dedicated and casual basis, as well as by users of varying skill levels, including the most basic level. At the same time, such digital printing machines or copiers are also being used by highly skilled and experienced operators, in a dedicated manner, within the centralized reprographic departments (CRD's) of large corporations or in key operator Quick Printing Shops.

As such, one model of such a digital printing machine can be made by a single manufacturer and intended for use in several different market environments, such as the general office environment and the CRD environment. As pointed out above, the skill levels and work practices of the actual machine users or operators differ greatly between such market environments. Ordinarily, the trend has been for the manufacturer to optimize the UI on each such model for a particular market environment, and thus to the user satisfaction and productivity detriment of any other market environment in which that same model is used.

There is therefore a need for a plural-mode, multi-market optimized UI and a reprographic machine having same, for increasing user satisfaction and productivity on the same reprographic machine in a plurality of different user markets.

SUMMARY OF THE PRESENT INVENTION

In accordance with the present invention, there is provided a plural-mode, multi-market user interface (UI) assembly for increasing user satisfaction and productivity on units of the same model of a machine in a plurality of different user markets. The UI assembly includes a display screen for displaying user dialog information, a series of machine process control and user interactive functional features for operator access to control operation of the machine, a plurality of different market optimized user dialog information display modes that are connected to the series of machine process control and user interactive functional features, for displaying on the display screen, an associated controller, and a means or device for selectively switching from one to another of the plurality of different market optimized user dialog information display modes, thereby enabling increased user satisfaction and user productivity on the same model of a machine in a plurality of different user markets.

BRIEF DESCRIPTION OF THE DRAWINGS

The following is a brief description of the drawings used to describe the present invention, and thus, these drawings are being presented for illustrative purposes only and thus should not limit the scope of the present invention, wherein.

DETAILED DESCRIPTION OF THE INVENTION

Figure 1:
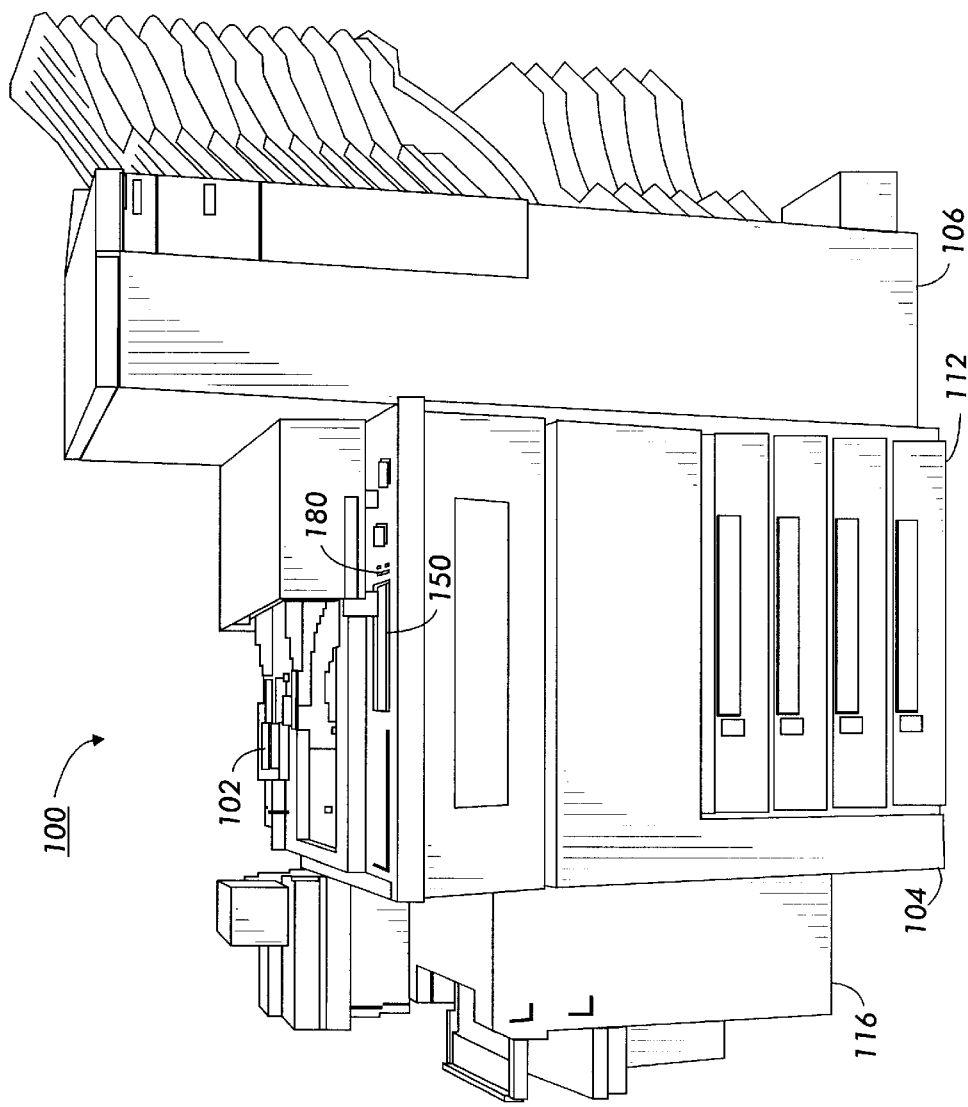
FIG. 1 is an illustration of a reprographic machine including the plural-mode, multi-market User Interface (UI) assembly in accordance with the present invention.

The following is a detailed description of the present invention. In this description, the drawings have been utilized to illustrate the concepts of the present invention. In this description as well as in the drawings, like reference numerals indicate the same items or equivalent items.

Figure 2:
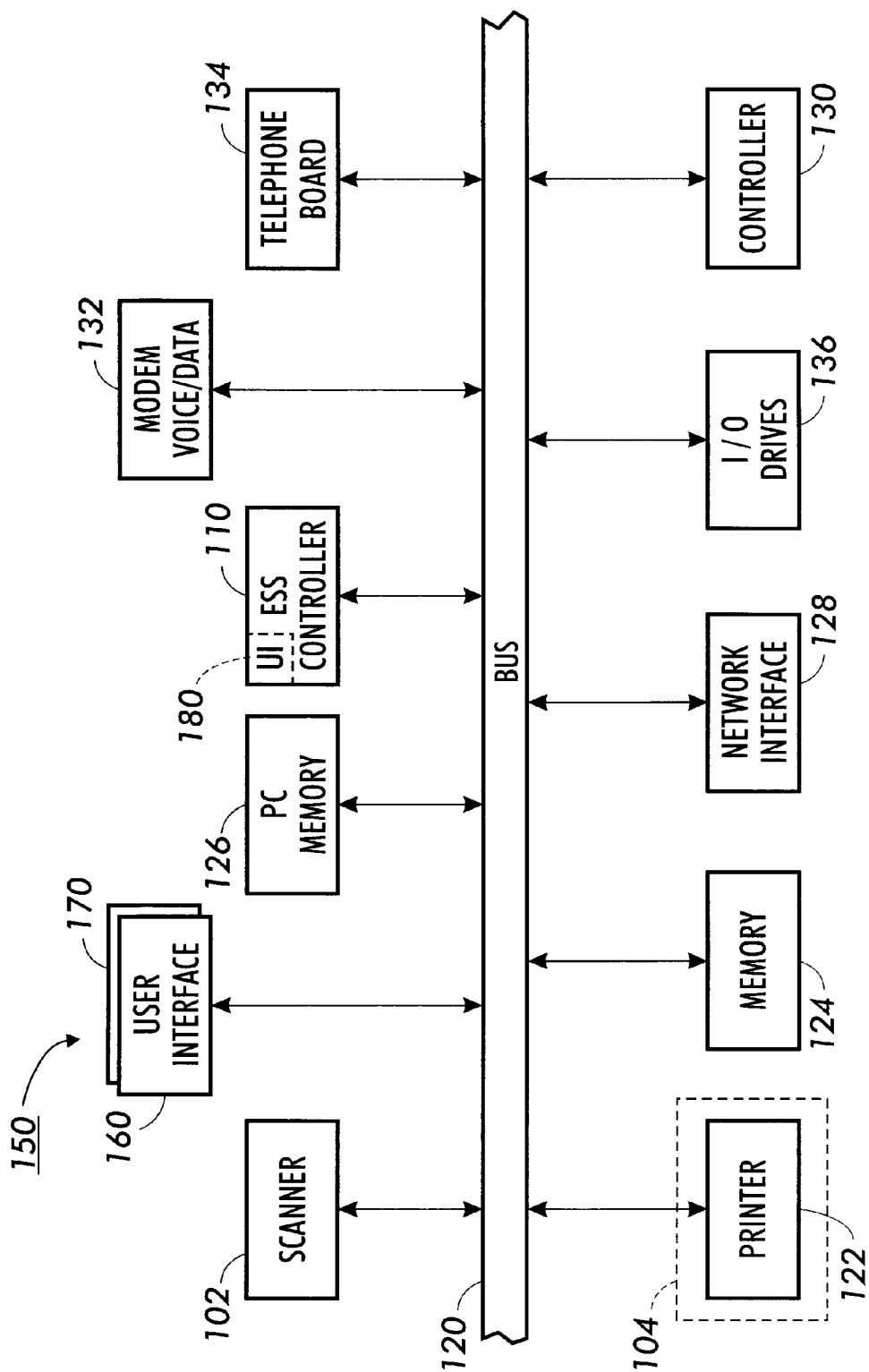
FIG. 2 is a block diagram illustration of the reprographic machine of FIG. 1.

Referring now to FIGS. 1–2, an overall construction, and a block diagram, of a digital reprographic machine 100 including the plural-mode, multi-market user interface (UI) assembly 150 of the present invention, are illustrated. As shown, the digital machine 100 includes a scanning device 102, a printing module 104, and the plural-mode, multi-market user interface (UI) assembly 150 (to be described in detail below). The digital machine 100 may also include a finisher device 106 which may be a sorter, tower mailbox or stapler, and at least an electronic subsystem (ESS) controller 110 for controlling all the features and functions of the machine 100. The printing module 104 may include a plurality of paper trays 112 that store paper used in the printing process. Lastly, the digital machine may include a high capacity feeder 116 which is capable of holding large amounts of paper stock to be used by the machine.

In a typical scanning function, the operator would utilize the scanning device 102 to scan in the images from the original documents. This scanning device 102 may be a platen type scanner or may include a constant velocity transport system which moves the original documents across a stationary scanning device. Moreover, the scanning device 102 may also include a document handling system which is capable of placing the original documents, automatically, on the glass platen for scanning.

With respect to the printing functions, the printing module 104 would retrieve the proper paper from one of the multiple paper trays 112 or the high capacity feeder 116, render the desired image on the retrieved paper, and output the printed image to the finishing device 106 for further operations.

An example of the basic architecture of the digital machine 100 is illustrated as a block diagram in detail in FIG. 2, and includes the scanner 102 which converts an original image into a set of digital signals that can be either stored or reproduced. The scanner 102 is connected to a central bus system 120 which may be either a single bus or a plurality of buses which provide interconnections and intercommunications between the various modules and stations on the digital machine.

The digital machine 100 also includes a digital printing device 122 of the printing module 104 (FIG. 2) which converts digital signals representing an image into a hardcopy of that image on a recording medium whether the recording medium be paper, transparency, or other type of markable medium. A first memory device 124 is provided for storing a variety of types of digital information such as machine fault information, machine history information, digital images to be processed at a later time, instruction sets for the machine or job instruction sets. A second memory device forming an electronic pre-collation memory section 126 may be provided for storing the digital representation of the image being presently rendered by the digital printing device 122. In the electronic pre-collation memory 126, the digital image is already laid out in its page structure so that it can be readily rendered by the digital printing device 122.

Since the digital machine 100 may be connected to a network including a PC work station (not shown), it includes a network interface 128 and an additional controller 130 which control the interrelationship between the various modules or stations on the digital machine 100 and the network.

In cases where the digital machine 100 is a multi-function machine, it would include, typically, a voice/data modem 132 and a telephone circuit board 134. Moreover, the digital machine may also include input/output drives 136 such as a floppy disc drive, a CD ROM drive, a tape drive, or other type of drive which can accept a portable memory device.

Referring now to FIGS. 1–4, the digital machine 100, in accordance with the present invention, includes the plural-mode, multi-market user interface (UI) assembly 150 for increasing user satisfaction and productivity on the same model of a machine in a plurality of different user markets. The plural-mode, multi-market user interface (UI) assembly 150 with the aid of the controller 110, effectively enables the user to control, at the machine, various functions of the digital machine by presenting various types of displays at the UI screen to the user for providing the user an opportunity to program certain job characteristics or function characteristics.

Figure 3:
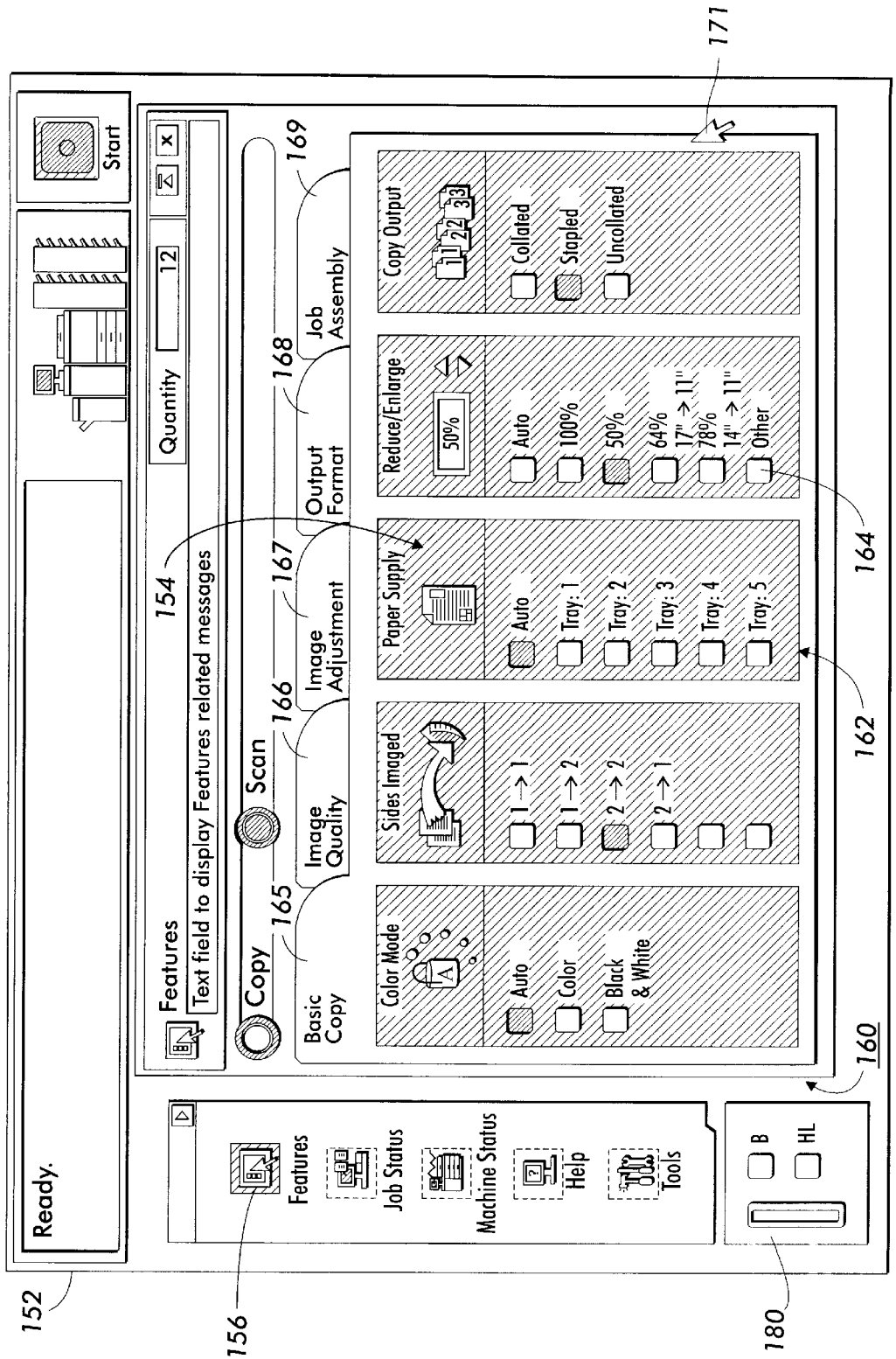
FIG. 3 is an illustration of a first mode of the plural-mode, multi-market User Interface (UI) assembly of the present invention.
Figure 4:
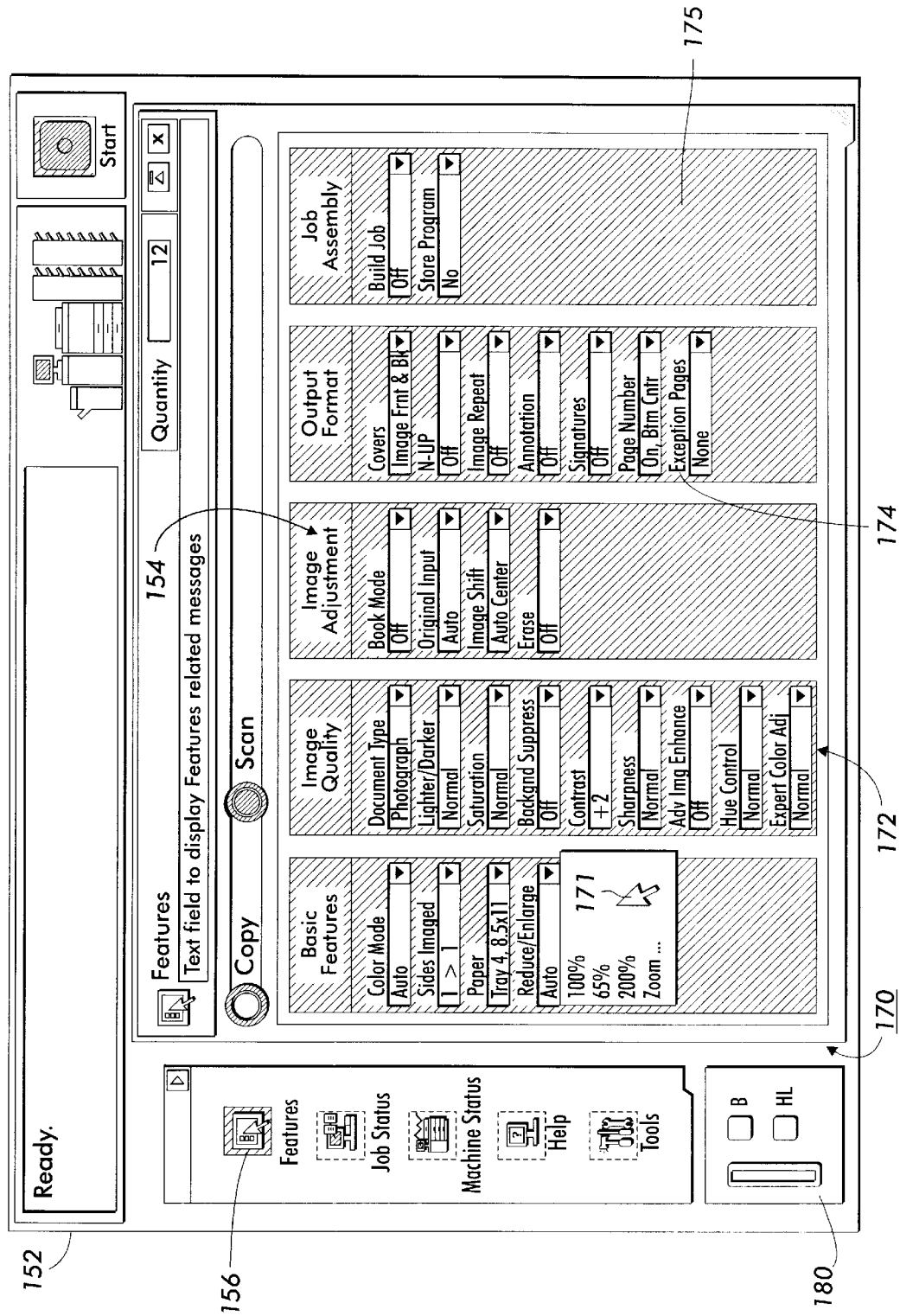
FIG. 4 is an illustration of a second mode of the plural-mode, multi-market User Interface (UI) assembly of the present invention.

Referring to FIGS. 3 and 4, the plural-mode, multi-market UI assembly 150 includes a display screen 152 for displaying user dialog information 154. It also includes a series of machine process control and user interactive functional features shown generally as 156, for operator access, and for controlling operation of the machine 100. The plural-mode, multi-market UI assembly 150 further includes a plurality of different market optimized user dialog information displayable modes 160, 170, that are each connected to the series of machine process control and user interactive functional features 156 for displaying on the display screen 152. An associated controller such as the ESS 110 is connected to and forms part of the plural-mode, multi-market UI assembly 150. Mode switching means or device shown as 180 are also provided as part of the plural-mode, multi-market UI assembly 150, so as to enable selectively switching from one to another of the plurality of different market optimized user dialog information display modes 160, 170. The result is an effectively enabled increased user satisfaction and user productivity on the different units of the same model of the machine 100 even when such different units are deployed and used in a plurality of different user markets.

The display screen 152 is any suitable display screen that is controlled by a point and click device. Alternatively, it can be a touch sensitive video screen, and may also include a point and click device 171 such as a mouse pointer. The means or device 180 for selectively switching from one to another of the plurality of different market optimized user dialog information display modes 160, 170, may for example comprise a programmed user identification (ID) number, an operator key (not shown) and any suitable means or device for reading and authenticating the operator key or ID. The series of machine process control and user interactive functional features 156 as illustrated include frequently used, simple and basic machine functional features 162, (FIG. 3) such as (1) color mode (auto, color, black and white); (2) sides imaged (1→1, 1→2, 2→2, 2→1); (3) paper supply (auto, tray 1, tray 2, tray 3, tray 4, tray 5); (4) reduce/enlarge (auto, 100%, 50%, 64% [17"→11"], 78% [14"→11"]; and (5) copy output (collated, stapled, uncollated).

The series of machine process control and user interactive functional features 156 as illustrated also include frequently used, simple and basic machine functional features listed above, as well as additional specialized job required and complex machine functional features 172, (FIG. 4) such as (6) document type (text; graphics, photograph); (7) lighter/darker (various levels); (8) saturation (normal, high, low); (9), background suppress (on; off); (10) contrast (+1; +2; +3); (11) sharpness; (12) adv. Image enhance; (13) hue control; (14) expert color adj.; (15) book mode; (16) original input mode; (17) image shift; (18) erase (on; off); (19) covers; (20) n-up; (21) image repeat; (22) annotation; (23) signatures; (24) page number; (25) exception pages; (26) build job; and (27) store program.

The plurality of different market optimized user dialog information display modes 160, 170 include at least a first display mode 160 that is connected mainly to the frequently used, simple and basic machine functional features 162, and a second mode 170 that is connected to the frequently used, simple and basic machine functional features 162 as well as to the specialized job required and complex machine functional features 172.

The first display mode 160 as illustrated (FIG. 3) is mainly graphics-based meaning that it uses a significant degree of graphics 164, to display information, and is thus suitable for easy, productive and satisfying use by a low skill, casual and occasional user. On the other hand, the second display mode 170, as illustrated (FIG. 4) is mainly text-based as illustrated, meaning that it uses mainly text 174, for displaying information, and thus is more suitable for productive and satisfying use by highly skilled and dedicated machine operators. Compared to the second, text-based mode 170 which features a single layer 175, the first graphic-based display mode 160 as further illustrated is multi-layered, and includes a plurality of displayable layers 175, 176, 177, 178 and 179.

In summary, the present invention provides a plural-mode, multi-market user interface (UI) assembly for increasing user satisfaction and productivity on units of the same model of a machine in a plurality of different user markets. The UI assembly includes a display screen for displaying user dialog information, a series of machine process control and user interactive functional features for operator access to control operation of the machine, a plurality of different market optimized user dialog information display modes that are connected to the series of machine process control and user interactive functional features, for displaying on the display screen, an associated controller, and a means or device for selectively switching from one to another of the plurality of different market optimized user dialog information display modes, thereby enabling increased user satisfaction and user productivity on the same model of a machine in a plurality of different user markets.

While the present invention has been described with reference to various embodiments as described above, it is not confined to the details set forth above, but is intended to cover such modifications or changes as may come within the scope to the attached claims.

What is claimed is:

1. A plural-mode, multi-market user interface (UI) assembly for increasing user satisfaction and productivity on the same model of a machine in a plurality of different user markets, the UI assembly comprising:
   (a) a display screen for displaying user dialog information;
   (b) a series of machine process control and user interactive functional features including basic machine functional features and complex machine functional features for operator access to control operation of the machine;
   (c) a plurality of different market optimized user dialog information display modes, connected to said series of machine process control and user interactive functional features, for displaying on said display screen, said different market optimized user dialog information display modes including a first display mode connected mainly to said basic machine functional features, and a second and different display mode connected to both said basic machine functional features and said complex machine functional features;
   (d) an associated controller; and
   (e) means for selectively switching from one to another of said plurality of different market optimized user dialog information display modes, thereby enabling increased user satisfaction and user productivity on the same model of a machine in a plurality of different user markets.

2. The plural-mode, multi-market user interface (UI) assembly of claim 1, wherein said display screen is a touch sensitive video screen.

3. The plural-mode, multi-market user interface (UI) assembly of claim 1, wherein said display screen is controlled by a point and click device.

4. The plural-mode, multi-market user interface (UI) assembly of claim 1, wherein said display screen is a touch sensitive video screen and includes a point and click device.

5. The plural-mode, multi-market user interface (UI) assembly of claim 1, wherein said means for selectively switching from one to another of said plurality of different market optimized user dialog information display modes comprises a device for reading and authenticating an operator identification.

6. The plural-mode, multi-market user interface (UI) assembly of claim 1, wherein said first display mode is graphics based and suitable for easy, productive and satisfying use by a casual and occasional user.

7. The plural-mode, multi-market user interface (UI) assembly of claim 6, wherein said first display mode includes a plurality of displayable layers.

8. The plural-mode, multi-market user interface (UI) assembly of claim 1, wherein said second display mode is text based and suitable for easy, productive and satisfying use by highly skilled and dedicated operators.

9. An electrostatographic reproduction machine for producing toner images on copy sheets, the electrostatographic reproduction machine comprising:
   (a) a moveable image bearing member having an image bearing surface;
   (b) means for forming a toner image on said image bearing surface and for transferring said toner image onto a copy sheet of paper; and
   (c) a plural-mode, multi-market user interface (UI) assembly for increasing user satisfaction and productivity on units of said reproduction machine in a plurality of different user markets, the UI assembly comprising:
      (i) a display screen for displaying user dialog information;
      (ii) a series of machine process control and user interactive functional features including basic machine functional features and complex machine functional features for operator access to control operation of the machine;
      (iii) a plurality of different market optimized user dialog information display modes, connected to said series of machine process control and user interactive functional features, for displaying on said display screen, said different market optimized user dialog information display modes including a first display mode connected mainly to said basic machine functional features, and a second and different display mode connected to both said basic machine functional features and said complex machine functional features;
      (iv) an associated controller; and
      (v) means for selectively switching from one to another of said plurality of different market optimized user dialog information display modes, thereby enabling increased user satisfaction and user productivity on units of said reproduction machine in a plurality of different user markets.

10. The electrostatographic reproduction machine of claim 9, wherein said display screen is controlled by a point and click device.

11. The electrostatographic reproduction machine of claim 9, wherein said display screen is touch sensitive video screen.

12. The electrostatographic reproduction machine of claim 9, wherein said display screen is a touch sensitive video screen and includes a point and click device.

13. The electrostatographic reproduction machine of claim 9, wherein said means for selectively switching from one to another of said plurality of different market optimized user dialog information display modes comprises a device for reading and authenticating an operator identification.

14. The electrostatographic reproduction machine of claim 9, wherein said first display mode is graphics based and suitable for easy, productive and satisfying use by a casual and occasional user.

15. The electrostatographic reproduction machine of claim 14, wherein said first display mode includes a plurality of displayable layers.

16. The electrostatographic reproduction machine of claim 9, wherein said second display mode is text based and suitable for easy, productive and satisfying use by highly skilled and dedicated operators.

* * * * *